(12) United States Patent
Bäse et al.

(10) Patent No.: US 8,788,912 B2
(45) Date of Patent: Jul. 22, 2014

(54) DEVICES AND METHOD FOR PROCESSING DATA PACKETS OF A DATA STREAM AND USE OF SAID DEVICES

(75) Inventors: Gero Bäse, München (DE); Norbert Oertel, Landshut (DE)

(73) Assignee: Unify GmbH & Co. KG, München (DE)

( * ) Notice: Subject to any disclaimer, the term of this patent is extended or adjusted under 35 U.S.C. 154(b) by 857 days.

(21) Appl. No.: 12/993,557

(22) PCT Filed: May 18, 2009

(86) PCT No.: PCT/EP2009/003520
§ 371 (c)(1),
(2), (4) Date: Feb. 17, 2011

(87) PCT Pub. No.: WO2009/141106
PCT Pub. Date: Nov. 26, 2009

(65) Prior Publication Data
US 2011/0149075 A1    Jun. 23, 2011

(30) Foreign Application Priority Data
May 20, 2008  (DE) .......................... 10 2008 024 255

(51) Int. Cl.
*H03M 13/00* (2006.01)

(52) U.S. Cl.
USPC ............................ 714/776; 714/779; 714/807

(58) Field of Classification Search
USPC .................... 714/776, 779, 807, 755, 760, 39
See application file for complete search history.

(56) References Cited

U.S. PATENT DOCUMENTS

| 5,550,847 A |   | 8/1996 | Zhu |
|---|---|---|---|
| 5,802,311 A | * | 9/1998 | Wronski ........................ 709/236 |
| 5,948,119 A | * | 9/1999 | Bock et al. .................... 714/807 |
| 5,953,418 A | * | 9/1999 | Bock et al. .................... 380/240 |
| 6,104,757 A |   | 8/2000 | Rhee |

FOREIGN PATENT DOCUMENTS

| EP | 1334581 B1 | 2/2007 |
|---|---|---|
| EP | 2297967 B1 | 5/2009 |
| JP | 2002-84239 | 3/2002 |

(Continued)

OTHER PUBLICATIONS

International Search Report and Written Opinion of the International Searching Authority for PCT/EP2009/003520 dated Sep. 11, 2009 (German Translation) (Forms PCT/ISA/220, PCT/ISA/210, PCT/ISA/237).

(Continued)

*Primary Examiner* — Fritz Alphonse
(74) *Attorney, Agent, or Firm* — Buchanan Ingersoll & Rooney PC (57) ABSTRACT

A method for processing data packets of a data stream, in which the received data packets are processed in real-time by a first unit and only data packets that are received error-free are processed by a second unit, include a data sink initially receiving only the data packets processed by a first unit. Once a second unit and the first unit are processing identical data packets nearly simultaneously, data packets processed by the second unit can be routed to the data sink. Embodiments of the invention can be used advantageously in video coding, for example with a video-on-demand service or image analysis within the framework of a surveillance system.

25 Claims, 3 Drawing Sheets

(56) References Cited

FOREIGN PATENT DOCUMENTS

| | | |
|---|---|---|
| JP | 2004-56393 | 2/2004 |
| JP | 2005295342 A | 10/2005 |
| JP | 2006-174280 | 6/2006 |
| JP | 2007-259050 | 4/2007 |
| JP | 2009182055 A | 8/2009 |
| WO | 2007-099468 A1 | 9/2007 |

OTHER PUBLICATIONS

International Search Report for PCT/EP2009/003520 dated Sep. 11, 2009 (Form PCT/ISA/210) (English Translation).

* cited by examiner

DEVICES AND METHOD FOR PROCESSING DATA PACKETS OF A DATA STREAM AND USE OF SAID DEVICES

CROSS-REFERENCE TO RELATED APPLICATIONS

This application is the United States national phase under 35 U.S.C. §371 of PCT International Application No. PCT/EP2009/003520, filed on May 18, 2009, and claiming priority to German Application No. 10 2008 024 255.1, filed on May 20, 2008. Both priority documents are incorporated by reference herein.

BACKGROUND OF THE INVENTION

1. Field of the Invention

Embodiments of the invention relate to devices and methods for processing data packets of a data stream and use of said devices.

2. Background of the Related Art

In recent years, the number of video and image-based monitoring systems has steadily increased. In the process, the data to be transferred are transmitted wirelessly, during which time transmission errors can occur. These transmission errors are resolved, for example, when faulty or missing data packets are sent out again. This results in high delay times during data packet transmission. In near-real-time applications, however, any data packet transmission delay times must be kept low. Consequently, the problem exists that repeat transfers of data packets cannot occur in near-real-time applications, because the real time requirement cannot be maintained.

Alternatively, by using a forward error correction code that accompanies the data packets to be transferred, faulty or missing data packets received can be reconstructed. This approach has the disadvantage that a portion of the transmission bandwidth is used for transmission of the forward error correction code (=redundancy). In addition, the approach presented will not work satisfactorily in the following cases during transmission of segments with greatly varying error rates:

(a) The redundancy is transmitted even though the data packets reached the receiver error-free, during which time transmission bandwidth was needlessly used.

(b) The redundancy is transmitted, but based on the high error rate, it is not sufficient to be able to completely reconstruct the faulty or missing data packets.

BRIEF SUMMARY OF THE INVENTION

Embodiments may provide methods and devices for processing data packets in a data stream that enables repeat transmission of data packets during near-real-time applications.

The invention relates in its first embodiment to a device for processing data packets in a data stream with first data packets that represent received error-free data packets, second data packets that represent received faulty data packets or missing data packets, and third data packets that are received error-free as a result of repeat transmission of data packets represented as second data packets, wherein a set of first data packets and a set of third data packets are disjunctive, and the device includes:

A first unit for processing first and second data packets into fourth data packets;

A control unit
  To activate a first mode when a second data packet is identified;
  To generate a copy of the first unit in the form of a second unit when the first mode is activated;
  To activate a second mode after the corresponding third data packet is present for each of the second data packets;

The second unit for processing first and third data packets into fifth data packets after activation of the first mode, wherein until activation of the second mode, the first unit routes fourth data packets, and after activation of the second mode, the second unit routes fifth data packets to a data sink.

The second data packet is understood to be a data packet that is faulty or not received but expected, that is, a missing data packet. If the data packet has not been received, a second data packet can be generated that represents the missing data packet, with an empty data field, for example.

BRIEF DESCRIPTION OF THE FIGURES

Embodiments of the invention and its further modification are explained in more detail based on the figures. The figures show.

Elements with the same function and mode of operation are included in the figures with the same references.

DETAILED DESCRIPTION OF THE INVENTION

The core of the invention is that, in the case of receiving faulty or missing data packets, i.e., second data packets, the data packets are processed by two independently running units, the first and the second unit. The first unit processes first and second data packets and in the process delivers fourth data packets in real time, which are transmitted to a data sink. Parallel to that, the second unit processes incoming first and third data packets into fifth data packets after the appearance of the second data packets. This ensures that the second unit decodes the data stream error-free, so that initially a longer delay time is acceptable. Only at the time when all second data packets can be replaced by corresponding third data packets, i.e. at the time of activation of the second mode, can the second unit provide the data stream to the data sink in real time. Precisely at this time, the second mode is then activated, at which point instead of fourth data packets, now only fifth data packets are transmitted to the data sink. It is hereby ensured that the processed data packets are received by the data sink in real time and after the data stream can be reconstructed in real time and error-free in the second unit, subsequently processed first data packets can be transmitted to the data sink.

A further advantage of the present invention is that the simple mechanism of repeated transmission, such as today with TCP/IP on the Internet (TCP—Transport Control Protocol, IP—Internet Protocol), can be used, so that the present device and corresponding method can be integrated at low cost into a transmission system that exists today.

Moreover, the use of the aforementioned device appears to be advantageous with predictive coding methods, in which information such as image data is predicated on already coded information. In the prior art, e.g., with the ITU-T H.263 video coding procedure, when transmission errors occur, see second data packet, it is necessary to code the information without prediction in order to prevent subsequent errors based on the transmission error. Coding without prediction causes a higher bandwidth requirement. The device, in contrast, enables the avoidance of forced coding without prediction to prevent subsequent errors when transmission errors occur and therefore saves bandwidth. Through the bandwidth savings, the rate of information transfer, e.g., the refresh rate, is also kept high, because in contrast to the prior art, bandwidth is available instead of forced coding without prediction for coding of additional information.

When generating a copy of the first unit in the form of a second unit during activation of the first mode, it is understood that at the time of activation of the first mode, the first and second units are initialized in such a way that, when coding one or more identical data packets, e.g. the first data packet, they deliver an identical coding result. If the first and the second unit are implemented in software, for example, then the copy is generated in such a way that the variable values and program conditions of both units are identical.

The set of first data packets and the set of third data packets are disjunctive. This means that data packets in the data stream are represented as either first or third data packets. A given data packet in the data stream therefore cannot be both a first data packet and a third data packet.

The control unit from the first embodiment can be also be such that it clears the first unit after activation of the second mode. As a result, system resources are freed up for a possible software implementation, whereby the overall performance of the device can be improved, for example through extra memory that is made available.

The first embodiment of the device preferably includes a supply unit for routing fourth data packets to the data sink up until activation of the second mode and for routing fifth data packets after activation of the second mode. As a result, routing of data packets processed through the first and second unit is controlled in a simple manner, depending on the mode.

According to the first embodiment, if error concealment is also used in the first unit during processing of the first and second data packets, then a quality feature, such as image quality, can be improved in the fourth data packets.

The invention in its second embodiment also includes a device for processing data packets in a data stream with first data packets that represent received error-free data packets; second data packets that represent received faulty or missing data packets; and third data packets that are received error-free as a result of repeat transmission of data packets represented as second data packets, wherein a set of first data packets and a set of third data packets are disjunctive, and the device includes:
  A first unit for processing first and third data packets into fourth data packets;
  A control unit
    To activate a first mode when a second data packet is identified;
    To generate a copy of the first unit in the form of a second unit when the first mode is activated;
    To activate a second mode after the corresponding third data packet is present for each of the second data packets;
  The second unit for processing the first and second data packets into fifth data packets after activation of the first mode, wherein until activation of the second mode, the first unit routes fourth data packets, and after activation of the second mode, the second unit routes fifth data packets to a data sink.

This second embodiment presents an alternative realization of the first embodiment. Therefore, in general, the advantages of the first embodiment are also found in the second embodiment. The second embodiment also has the advantage that the first unit always processes the first and third data packets and therefore can be implemented as hardware, for example. However, in the second embodiment the second unit is only temporarily used and therefore can be implemented in software, for example.

In a preferred second embodiment, the control unit is also designed to clear the second unit after activation of the second mode. As a result, system resources are freed up for a possible software implementation, whereby the overall performance of the device can be improved, for example through extra memory that is made available.

In the second embodiment, preferably the control unit is also designed
  To route fourth data packets to the data sink until activation of the first mode and after activation of the second mode,
  To route fifth data packets to the data sink after activation of the first mode and until activation of the second mode.

As a result, routing of data packets processed through the first and second unit is controlled in a simple manner, depending on the mode.

In the second embodiment, preferably the second unit is designed for processing first and second data packets also with the aid of error concealment. As a result, the quality, e.g., image quality, of the fourth data packets can be improved.

It is preferable for the control unit also to be designed so that the second mode can only be activated if a corresponding third data packet is present for each second data packet and the first unit and second unit are processing the same first data packet nearly simultaneously. It is thereby ensured that the data sink can receive fifth data packets instead of fourth data packets without noticeable delay. Nearly simultaneously is understood to mean that in the first and second units, the same first data packet is being processed at a given point in time, for example, the first unit has processed 95% of a first data packet and the second unit has processed 10% of the same first data packet.

In a further embodiment, the second unit further includes a memory for caching first and third data packets and a sorting unit for sorting first and third data packets, wherein the sorting unit ensures a chronological sequence of first and third data packets for proper processing. As a result, the second unit, with an identical setup to the first unit, can be used because caching and sorting are performed by the control unit. Thus the second unit can be generated cost-effectively and with low development effort.

The data stream preferably features coded multimedia data, especially coded video data, and the first and second units are preferably each designed as analysis units, especially image or video analysis units, for analyzing multimedia data. As a result, the invented device is useful in an analysis device, especially applicable for surveillance.

Alternatively, the data stream features coded multimedia data, especially coded video data, and the first and second units are each designed as decoding units, especially video decoding units, for decoding coded multimedia data. As a result, the device is useful in a decoder, especially for decoding of an encoded video.

The invention in a third embodiment also relates to a method for processing data packets in a data stream with first data packets that represent received error-free data packets; second data packets that represent received faulty or missing, i.e. not received, data packets; and third data packets that are received error-free as a result of repeat transmission of data packets represented as second data packets, where a set of first data packets and a set of third data packets are disjunctive, and the following steps are carried out:

Processing of first and second data packets into fourth data packets by the first unit;

Activation of a first mode when a second data packet is identified;

Generation of a copy of the first unit in the form of a second unit when the first mode is activated;

Activation of a second mode after a corresponding third data packet is present for each of the second data packets;

Processing of first and third data packets into fifth data packets by the second unit after activation of the first mode, wherein, until activation of the second mode, the fourth data packets and, after activation of the second mode, the fifth data packets are routed to a data sink.

The advantages to this are analogous to those of the device in the first embodiment.

If the first unit is cleared after activation of the second mode, then system resources can be spared for carrying out the procedure.

Until activation of the second mode, fourth data packets and, after activation of the second mode, fifth data packets are preferably routed with a supply unit to the data sink. As a result, routing of processed data packets can be controlled in a simple manner, depending on the mode.

A16: In a further embodiment of the invention, the first unit also processes the first and second data packets using error concealment. As a result, the quality, e.g., image quality, of the fourth data packets can be improved.

A fourth embodiment of the invention also relates to a method for processing data packets in a data stream with first data packets that represent received error-free data packets; second data packets that represent received faulty data packets or missing, i.e. not received, data packets; and third data packets that are received error-free as a result of repeat transmission of data packets represented as second data packets, wherein a set of first data packets and a set of third data packets are disjunctive, and the following steps are carried out:

Processing first and third data packets into fourth data packets by a first unit;

Activation of a first mode when a second data packet is identified;

Generation of a copy of the first unit in the form of a second unit when the first mode is activated;

Activation of a second mode after a corresponding third data packet is present for each of the second data packets;

Processing first and second data packets into fifth data packets by the second unit after activation of the first mode, wherein, until activation of the first mode and after activation of the second mode, fourth data packets and, after activation of the first mode and until activation of the second mode, fifth data packets are routed to a data sink.

The advantages to this are analogous to those of the device in the second embodiment.

If, according to the fourth embodiment, the second unit is disconnected after activation of the second mode, then system resources can be spared for carrying out the procedure.

The fourth embodiment preferably uses a supply unit for routing fourth data packets, until activation of the first mode and after activation of the second mode, and fifth packets, after activation of the first mode and until activation of the second mode, to the data sink. As a result, routing of processed data packets can be controlled in a simple manner, depending on the mode.

In addition, in the fourth embodiment of the invention, the first and second data packets can be further processed by the second unit using error concealment. As a result, an increase in a quality aspect of the processed data packets, i.e., the fifth data packets, can be achieved.

If the second mode is activated, after the corresponding third data packet is present for each of the second data packets and the first unit and second unit are processing the same first data packet nearly simultaneously, then it is ensured that the data sink, without noticeable delay, can receive fifth data packets instead of fourth data packets starting when the second mode is activated. Preferably, the control unit caches first and third data packets using a memory and sorts first and third data packets using a sorting unit, wherein the sorting unit ensures a chronological sequence of first and third data packets for proper processing. As a result, the second unit, with a setup identical to that of the first unit, can be used because caching and sorting are performed by the control unit. Thus the second unit also can be generated cost-effectively and with low development effort.

The data stream preferably has coded multimedia data, especially coded video data, and the first and second units are each designed as analysis units, especially image or video analysis units, for analyzing multimedia data. As a result, the invented device is useful in an analysis device, especially applicable for surveillance.

Alternatively, the data stream has coded multimedia data, especially coded video data, and the first and second units are each designed as decoding units, especially video decoding units, for decoding coded multimedia data. As a result, the device is useful in a decoder, especially for decoding of an encoded video.

Finally, the invention relates to use of the device according to at least one of the embodiments listed above, wherein the device is used for analysis of video data in the context of a surveillance installation. Use of the invention in the context of a surveillance installation enables an improvement of the video data analysis.

Figure 1:
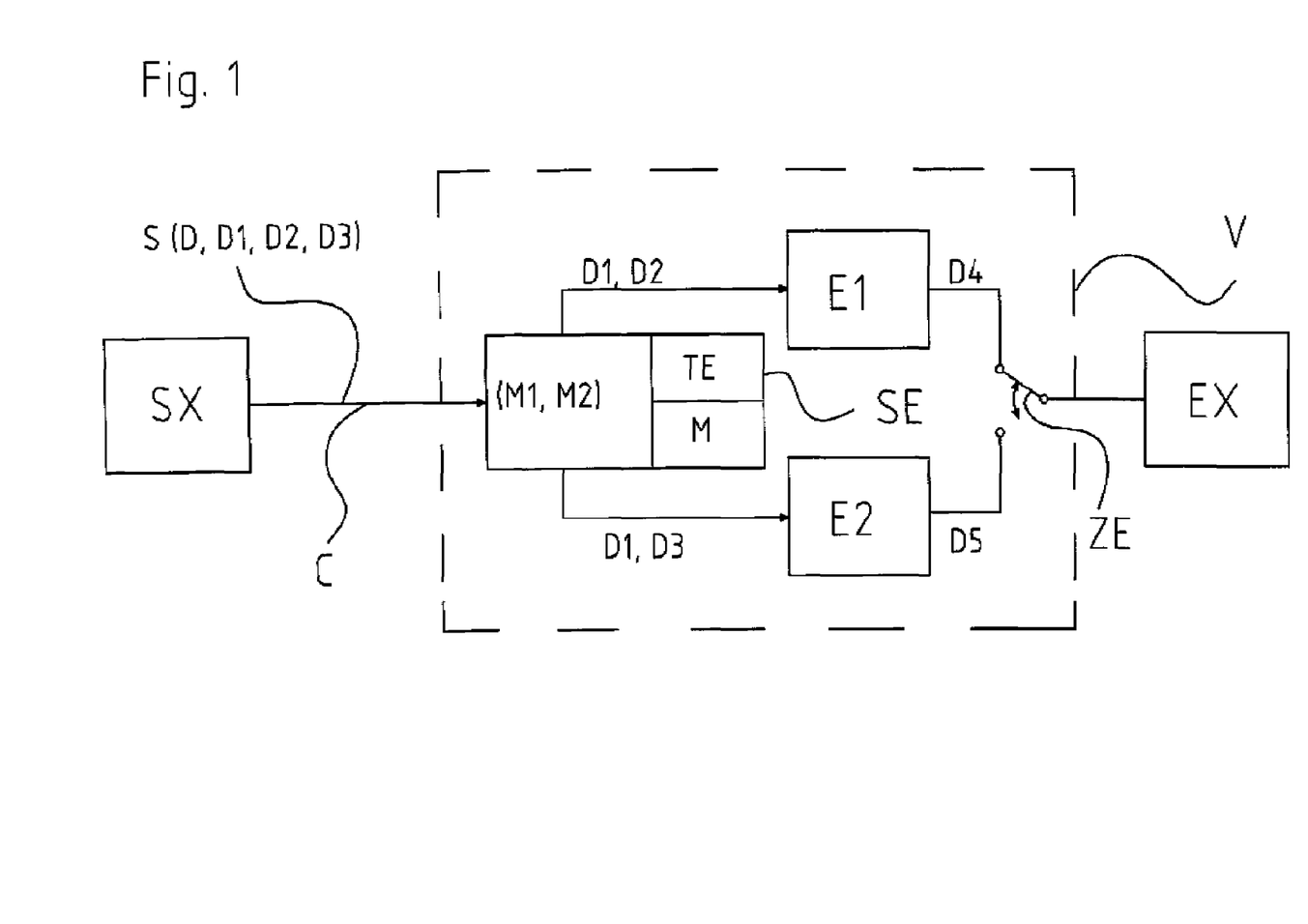
FIG. 1 A sender for transmitting data packets, a device for processing data packets, and a receiver for reconstructing the compiled data packets.

FIG. 1 shows one embodiment of the invention. Here real time image data in a sender SX are captured by a camera and coded in the form of a data stream S. Coding occurs here by means of a standardized video coding procedure, for example according to an MPEG-2 or H.264 process (MPEG—Motion Picture Expert Group). The data stream S is segmented for transmission in data packets D.

The data packets D of the data stream S are transmitted from the sending unit SX via a transmission channel C to device V. The transmission channel functions, for example, according to the WLAN standard (WLAN—Wireless Local Area Network), where transmission errors can occur. The transmitted data packets D are received by the control unit SE of the device V via transmission channel C. Thereby, the first data packets D1 are understood to be received error-free data packets and the second data packets D2 are understood to be received faulty data packets or data packets that were not received. The control unit can therefore recognize, based on a sequence number, for example, that one of the data packets transmitted by the sender SX through the control unit is missing, whereby the missing data packet is classified as a second data packet.

The control unit SE routes first and second data packets D1, D2 to a first unit E1 for processing. If a data packet has not been received, then the control unit SE can pass on an empty second data packet D2. In the present embodiment, the first unit E1 is a first video coding unit that decodes first and second data packets and from this generates fourth data packets D4. The first unit E1 optionally is equipped with an error concealment unit that processes missing data packets or faulty data packets, i.e., second data packets, in such a way that the fourth data packets have only slight visual degradations. The fourth data packets are routed to a data sink EX, such as a monitor. A supply unit ZE for this is configured as a switching element in such a way that it initially redirects only fourth data packets.

The control unit SE tests the received data packets and ascertains whether a second data packet exists. For example, the control unit SE identifies the second data packet based on an error correction code, for example a CRC test code (CRC—Check Redundancy Code), or based on a missing sequence number that shows that one of the data packets has gotten lost during the transmission over channel C. When a second data packet D2 is identified, the control unit SE activates the first mode M1. At this point in time, a second unit E2 for processing data packets is configured and possibly also activated. If the first and second units are generated, for example, with an object-oriented programming language respectively as unit objects, then the second unit, through creation of a second unit object, e.g., a second video coding unit, and through copying of all variable values and conditions of the first unit object (=first unit) can be produced as a quasi-complete copy of the first unit.

In addition, the control unit SE requests those second data packets from the sender SX that are received at the control unit as third data packets error-free. It is important to mention here that these third data packets D3 are not a subset of the first data packets D1. After the point when the first mode M1 is activated, the control unit SE transfers first and third data packets to the second unit E2. The second unit E2 also performs processing, such as decoding first and third data packets into fifth data packets D5. While the first mode is active, fourth and fifth data packets are created, wherein only fourth data packets are routed to the data sink. Fourth and fifth data packets are also designated as processed data packets.

After the respective corresponding data packet is present for all second data packets of the second unit E2, the control unit activates the second mode M2, whereby the first mode M1 is deactivated. At this point, the supply unit ZE switches such that, from that point on, only fifth data packets D5, instead of fourth data packets D4, are transferred to the data sink EX, i.e., the receiver. In a further variation, activation of the second mode M2 then takes place only after the first and second units E1, E2 process the same first data packet nearly simultaneously. Nearly simultaneously is understood to mean that in the first and second units, the same first data packet is processed at a given point in time, for example, the first unit has processed 95% of the first data packet and the second unit has processed 10% of the same first data packet. Because the third data packets reach the control unit SE with a delay, it caches the third data packets in a cache M using a sorting unit TE and sorts the first and third data packets in such a way that first and third data packets are routed to the second unit in the correct sequence, e.g. with ascending sequence numbers. Only after the second unit has processed the same first data packet as the first unit can the second unit output the subsequent first data packets in real time. Therefore, a switch from fourth to fifth data packets for routing to the data sink can then occur without a delay being noticed at the data sink during routing of the processed data packets.

When the second mode M2 is activated, the first unit can be deactivated and/or deleted, because after this point only processed data packets from the second unit E2, i.e., fifth data packets D5, are routed to the data sink. Through deletion of the first unit, system resources are freed up for possible implementation via software.

The device V according to FIG. 1 includes, in addition to the control units SE, the first and second units E1, E2 and the supply unit TE.

Figure 2:
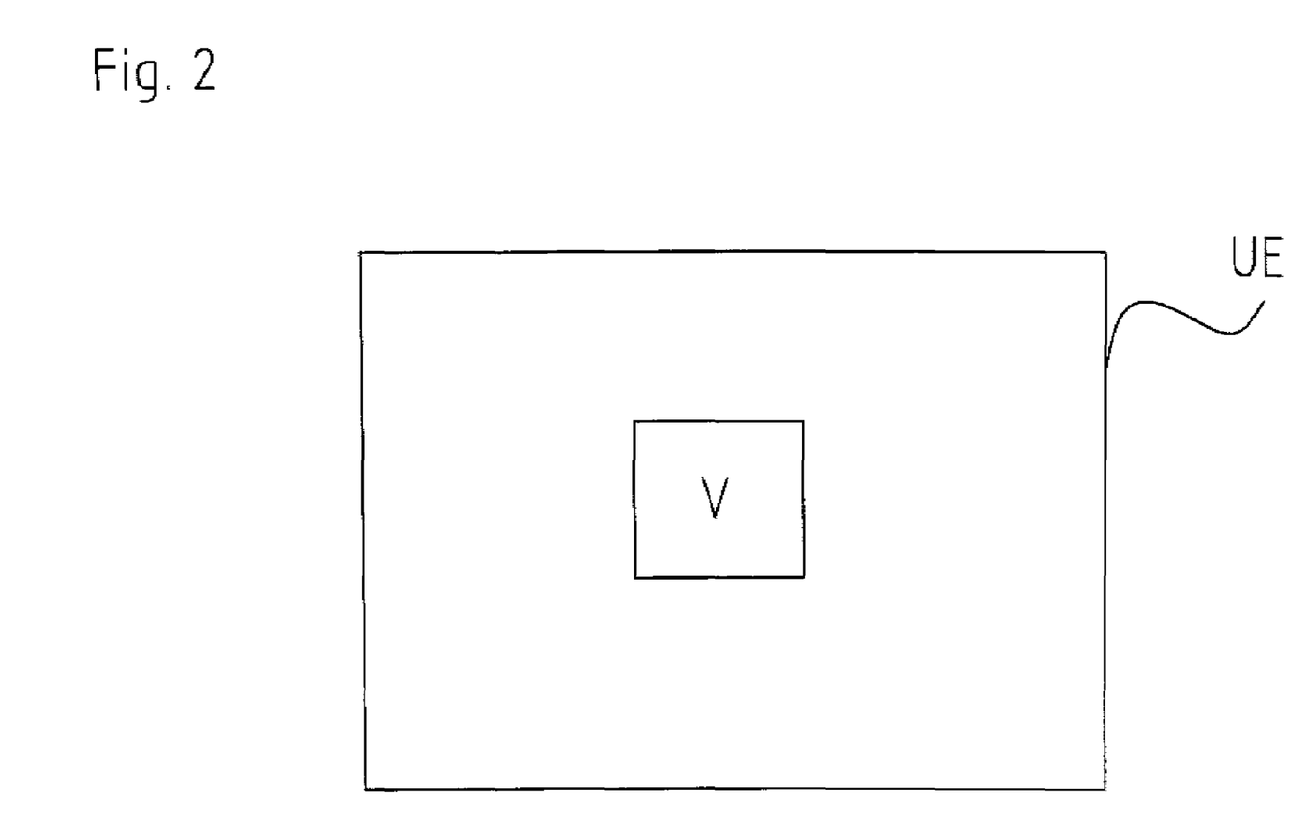
FIG. 2 A monitoring unit including the device for processing data packets.

FIG. 2 symbolically portrays the use of the device V in the context of a surveillance installation UE. Image data are transmitted through the data packets in this example. The first and second units are a respective analysis unit for testing the image content of image data, as in personal recognition, for example. The use of first and second data packets allows real-time image analysis, but errors will be taken into account during the analysis. Through chronologically parallel analysis of first and third data packets by the second unit, optimal image analysis is ensured, because the second unit works on error-free image data. After the second mode is attained, image analysis is performed using only the second unit. Therefore, not only is image analysis possible in real time, but also optimal image analysis can be achieved after routing of all third data packets, and is then also available in real time again.

Figure 3:
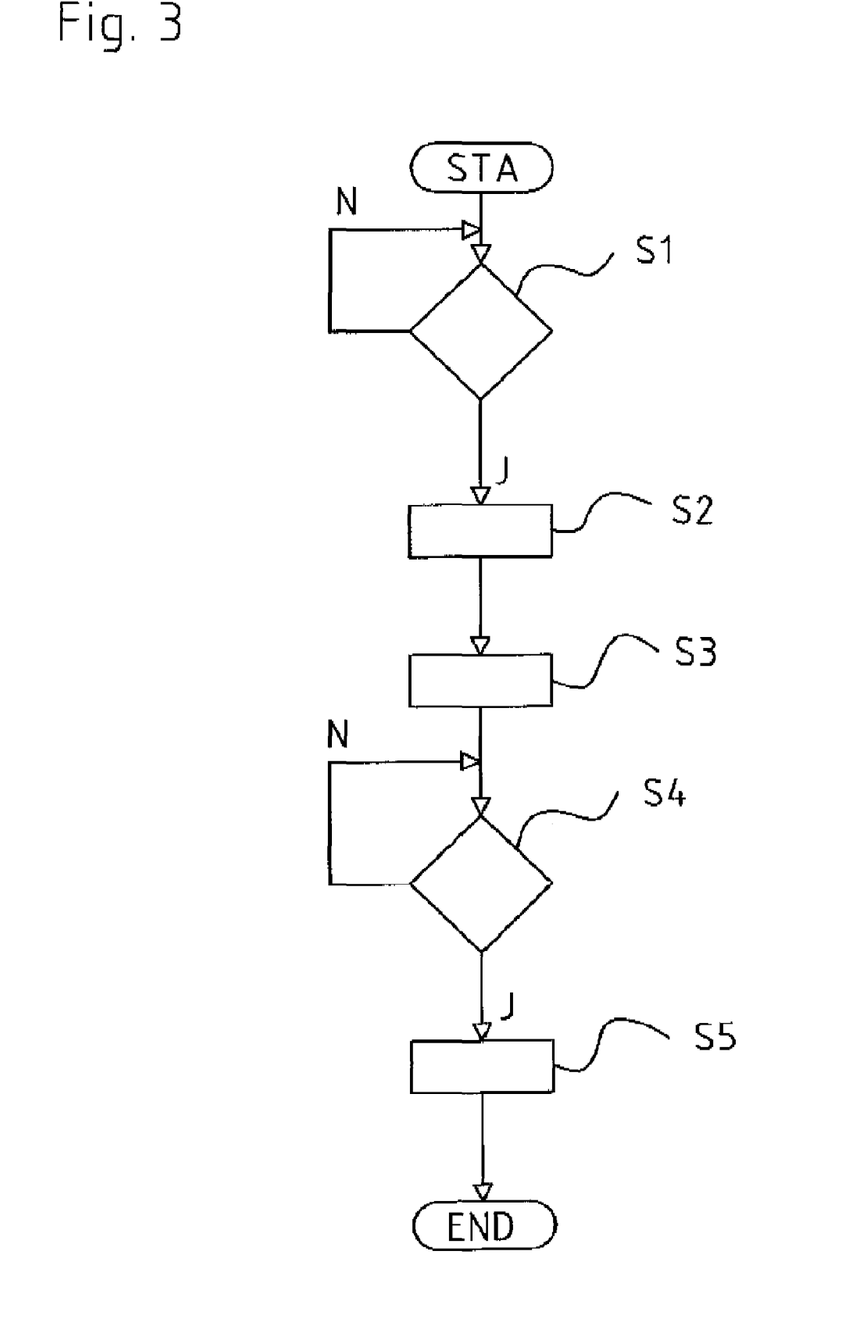
FIG. 3 A flow diagram for implementing a procedure for processing data packets.

In addition to the device, the invention also relates to a method with the following steps that are explained in more detail based on a flow diagram according to FIG. 3: STA: The flow diagram starts with step STA.

S1: In step S1, it is determined whether the just-received data packet is a second data packet or represents a second data packet, i.e., is faulty itself or can be associated with a non-received data packet. If the answer is no, step S1 follows again; otherwise step S2 follows.

S2: In step S2, the first mode M1 is activated. First and second data packets are processed during the first mode from the first unit E1. The processed data packets, i.e. fourth data packets, are transmitted to the data sink. Step S3 follows.

S3: In step S3, the second unit E2 is started up as a copy of the first unit E1. First and third data packets D1, D3 are processed through the second unit E2 into fifth data packets. Step S4 is run next.

S4: In step S4, it is determined whether a respective third data packet D3 has been received for each of the second data packets. If this is not the case, step S4 is repeated; otherwise it continues to step S5.

S5: In this step S5, the second mode M2 is activated. Instead of fourth data packets, fifth data packets are transmitted to the data sink. Step END runs next.

END: In this step, the flow diagram ends.

The invention and its further modifications can be implemented and executed in software or hardware or a combination of software and hardware. In addition to processing in the forms of image analysis and video decoding, other areas of application are possible, such as audio coding or speech coding.

Embodiments of the invention and its further modifications have been depicted based on the first or third embodiment example. Implementation and execution of the second or fourth embodiment can be implemented similarly.

The invention claimed is:

1. A device for processing data packets in a data stream, said data stream comprising first data packets that represent received error-free data packets; second data packets that represent received faulty data packets or non-received data packets; and third data packets that are received error-free as a result of repeat transmission of data packets represented as second data packets, wherein a set of first data packets and a set of third data packets are disjunctive, the device comprising:

a first unit, said first unit processing the first and second data packets into fourth data packets;

a control unit, said control unit:

activating a first mode when a second data packet is identified;

generating a second unit when the first mode is activated, the second unit having variables and conditions copied from the first unit; and activating a second mode after the corresponding third data packet is present for each of the second data packets;

a second unit, said second unit for processing first and third data packets into fifth data packets after activation of the first mode, wherein the first unit routes fourth data packets, until activation of the second mode, and the second unit routes fifth data packets, after activation of the second mode, to a data sink.

2. The device of claim 1, wherein the control unit clears the first unit after activation of the second mode.

3. The device of claim 1, comprising a supply unit, said supply unit:

routing the fourth data packets to the data sink until activation of the second mode; and routing the fifth data packets to the data sink after activation of the second mode.

4. The device of claim 1, said first unit further processing first and second data packets using error concealment.

5. A device for processing data packets in a data stream, said data stream comprising first data packets that represent received error-free data packets, second data packets, that represent received faulty data packets or non-received data packets, and third data packets that are received error-free as a result of repeat transmission of data packets represented as second data packets, wherein a set of first data packets and a set of third data packets are disjunctive, the device comprising:

a first unit, said first unit processing first and third data packets into fourth data packets;

a control unit, said control unit:

activating a first mode when a second data packet is identified;

generating a second unit when the first mode is activated, the second unit having variables and conditions copied from the first unit; and activating a second mode after the corresponding third data packet is present for each of the second data packets;

the second unit processing first and second data packets into fifth data packets after activation of the first mode, wherein the first unit routes fourth data packets, until activation of the first mode and after activation of the second mode, and the second unit routes fifth data packets, after activation of the first mode and until activation of the second mode, to a data sink.

6. The device of claim 5, said control unit clearing the second unit after activation of the second mode.

7. The device of claim 5, further comprising, a supply unit, said supply unit:

routing the fourth data packets to the data sink until activation of the first mode and after activation of the second mode;

routing the fifth data packets to the data sink after activation of the first mode and until activation of the second mode.

8. The device of claim 5, wherein the second unit further processes first and second data packets using error concealment.

9. The device of claim 5, wherein the control unit activates the second mode after the corresponding third data packet is present for each of the second data packets and the first unit and second unit process the same first data packet nearly simultaneously.

10. The device of claim 5, wherein the control unit comprises a memory for caching the first and third data packets and a sorting unit for sorting the first and third data packets, and wherein the sorting unit ensures a chronological sequence of first and third data packets for proper processing.

11. The device of claim 1, wherein the data stream comprises coded multimedia data, and wherein the first and second units are each analysis units for analyzing multimedia data.

12. The device of claim 1 wherein the data stream comprises coded multimedia data, and wherein the first and second units are decoder units for decoding coded multimedia data.

13. A method for processing data packets in a data stream, said data stream comprising first data packets that represent received error-free data packets, second data packets that represent received faulty data packets or non-received data packets, and third data packets that are received error-free as a result of repeat transmission of data packets represented as second data packets, wherein a set of first data packets and a set of third data packets are disjunctive, the method comprising:

a device processing first and second data packets into fourth data packets through a first unit of the device;

a control unit of the device activating a first mode when a second data packet is identified;

the control unit of the device generating a second unit such that the generated second unit has variables and conditions of the first unit when the first mode is activated;

the control unit of the device activating a second mode after the corresponding third data packet is present for each of the second data packets; and the device processing the first and third data packets into fifth data packets through the second unit after activation of the first mode, wherein fourth data packets, until activation of the second mode, and fifth data packets, after activation of the second mode, are routed to a data sink.

14. The method of claim 13, comprising clearing the first unit after activation of the second mode.

15. The method of claim 13, comprising routing the fourth data packets to the data sink by a supply unit until activation of the second mode, and routing the fifth data packets to the data sink by the supply unit, after activation of the second mode.

16. The method of claim 13, comprising processing the first and second data packets are further processed through the first unit using error concealment.

17. A method for processing data packets in a data stream with first data packets that represent received error-free data packets, second data packets that represent received faulty data packets or non-received data packets, and third data packets that are received error-free as a result of repeat transmission of data packets represented as second data packets, wherein a set of first data packets and a set of third data packets are disjunctive, the method comprising:

a device processing first and third data packets into fourth data packets through a first unit;

a control unit of the device activating a first mode when a second data packet is identified;

the control unit generating a second unit when the first mode is activated, the second unit being generated to have defined variables and conditions copied from the first unit;

the control unit activating a second mode after the corresponding third data packet is present for each of the second data packets; and the device processing the first and second data packets into fifth data packets through the second unit after activation of the first mode, wherein fourth data packets, until activation of the first mode and after activation of the second mode, and fifth data packets, after activation of the first mode and until activation of the second mode, are routed to a data sink.

18. The method of claim 17, comprising clearing the second unit after activation of the second mode.

19. The method of claim 17 comprising with a supply unit, routing fourth data packets to the data sink, until activation of the first mode and after activation of the second mode, and routing the fifth data packets to the data sink after activation of the first mode and until activation of the second mode.

20. The method of claim 17, comprising processing the first and second data packets through the second unit using error concealment.

21. The method of claim 17, comprising activating the second mode after the corresponding third data packet is present for each of the second data packets and the first unit and second unit process the same first data packet nearly simultaneously.

22. The method of claim 13, comprising caching the first and third data packets through the second unit into a memory, and sorting the first and third data packets using a sorting unit wherein the sorting unit ensures a chronological sequence of first and third data packets for proper processing.

23. The method of claim 13, wherein the data stream comprises coded multimedia data, and wherein the first and second units are analysis units, for analyzing multimedia data.

24. The method of claim 13, wherein the data stream comprises coded multimedia data, and wherein the first and second units are decoder units, for decoding coded multimedia data.

25. Use of a device according to one of claim 1 for analysis of video data in the context of a surveillance installation.

* * * * *